(12) United States Patent
Takahashi

(10) Patent No.: US 9,278,581 B2
(45) Date of Patent: Mar. 8, 2016

(54) PNEUMATIC TIRE

(71) Applicant: Sumitomo Rubber Industries, Ltd., Kobe-shi, Hyogo (JP)

(72) Inventor: Shingo Takahashi, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 725 days.

(21) Appl. No.: 13/644,950

(22) Filed: Oct. 4, 2012

(65) Prior Publication Data

US 2013/0105051 A1    May 2, 2013

(30) Foreign Application Priority Data

Oct. 27, 2011    (JP) .................................. 2011-236340

(51) Int. Cl.
    *B60C 11/03*    (2006.01)
    *B60C 11/11*    (2006.01)

(52) U.S. Cl.
    CPC ..... *B60C 11/0302* (2013.04); *B60C 2011/0346* (2013.04); *B60C 2011/0358* (2013.04); *B60C 2011/0365* (2013.04); *B60C 2011/0376* (2013.04); *B60C 2011/1209* (2013.04); *B60C 2011/1213* (2013.04); *B60C 2011/1227* (2013.04)

(58) Field of Classification Search
    CPC ............... B60C 11/0302; B60C 2011/0381; B60C 2011/0358; B60C 2011/0365; B60C 2011/0372; B60C 2011/0374; B60C 11/032; B60C 2011/0376; B60C 11/03; B60C 11/0306; B60C 11/0309; B60C 2011/0339; B60C 2011/0344; B60C 2011/0346; B60C 2011/0353; B60C 11/11

USPC ......... 152/209.1, 209.9, 209.16, 209.28, 902, 152/903

See application file for complete search history.

(56) References Cited

U.S. PATENT DOCUMENTS

| | | | |
|---|---|---|---|
| 4,667,717 A * | 5/1987 | Graas | 152/209.18 |
| 8,985,170 B2 * | 3/2015 | Kaba | 152/209.8 |
| 2003/0019555 A1 | 1/2003 | Nakagawa | |
| 2011/0073230 A1 * | 3/2011 | Ishiguro et al. | 152/209.18 |
| 2012/0285594 A1 * | 11/2012 | Okabayashi | 152/209.16 |

FOREIGN PATENT DOCUMENTS

JP    2003-11618 A    1/2003

* cited by examiner

*Primary Examiner* — Eric Hug
(74) *Attorney, Agent, or Firm* — Birch, Stewart, Kolasch & Birch, LLP

(57) ABSTRACT

A pneumatic tire with a specified rotational direction includes a tread portion provided with a pair of circumferentially extending crown main grooves disposed on both sides of the tire equator, a plurality of inclined lateral grooves each extending axially outside of the tire from each crown main groove to each tread edge toward the anti-rotational direction to separate a plurality of shoulder blocks between crown main grooves and tread edges, and a sipe, inclined lateral grooves with inclinations of 45-85 degrees with respect to the tire circumferential direction, each shoulder block with a heel-side edge and a toe-side edge which comes into contact with a road later than the heel-side edge in the specified rotational direction, in a planer view, the heel-side edge smoothly extending in a curved manner from a first end intersecting a groove wall of the crown main groove to a second end intersecting the tread edge.

10 Claims, 3 Drawing Sheets

PNEUMATIC TIRE

BACKGROUND OF THE INVENTION

1. Field of the Invention

The present invention relates to a pneumatic tire in which running performance on snowy roads can be improved while keeping steering stability, drainage performance and running performance on icy roads.

2. Description of the Related Art

In recent years, pneumatic tires for winter such as studless tires have a lot of chances to run not only snowy and icy roads but also dry and wet roads. Accordingly, such pneumatic tires for winter are required to improve not only running performance on snowy and icy roads but also steering stability and drainage performance in well-balanced manner.

Generally, in order to improve drainage performance and running performance on snowy roads, a tire with a tread portion provided with a main groove with a large width is proposed. Such tire can smoothly drain water and snow under the tread portion to the outside of the tire. On the other hand, the ground contact area in the tread portion of such tire tends to decrease due to the large width of the groove, and thereby pattern rigidity of the tread portion and friction force against roads may deteriorate. Accordingly, such tire tends to have low steering stability and low running performance on icy roads.

It is an object of the present invention to provide a pneumatic tire in which running performance on snowy roads can be improved while keeping steering stability, drainage performance and running performance on icy roads.

SUMMARY OF THE INVENTION

In accordance with the present invention, there is provided a pneumatic tire having a specified rotational direction comprising, a tread portion provided with: a pair of circumferentially extending crown main grooves disposed on both sides of the tire equator; a plurality of inclined lateral grooves each extending axially outside of the tire from each crown main groove to each tread edge toward the anti-rotational direction to separate a plurality of shoulder blocks between crown main grooves and tread edges; and a sipe, said inclined lateral grooves having inclination angles of from 45 to 85 degrees with respect to the circumferential direction of the tire, said each shoulder block having a heel-side edge and a toe-side edge which comes into contact with a road later than the heel-side edge in the specified rotational direction, in a planer view, said heel-side edge smoothly extending in a curved manner from a first end intersecting a groove wall of said crown main groove to a second end intersecting said tread edge through a middle point which is a center between the first end and the second end in the axial direction of the tire, said heel-side edge having a radius of curvature of from 150 to 250 mm which is measured as a radius of curvature of an arc passing through the first end, the second end and the middle point, and all sipes provided on shoulder blocks terminating without connecting to heel-side edges.

BRIEF DESCRIPTION OF THE DRAWINGS

FIG. 3 (*b*) is a front view of FIG. 3(*a*).

DETAILED DESCRIPTION

An embodiment of the present invention will be explained below with reference to the accompanying drawings.

Figure 1:
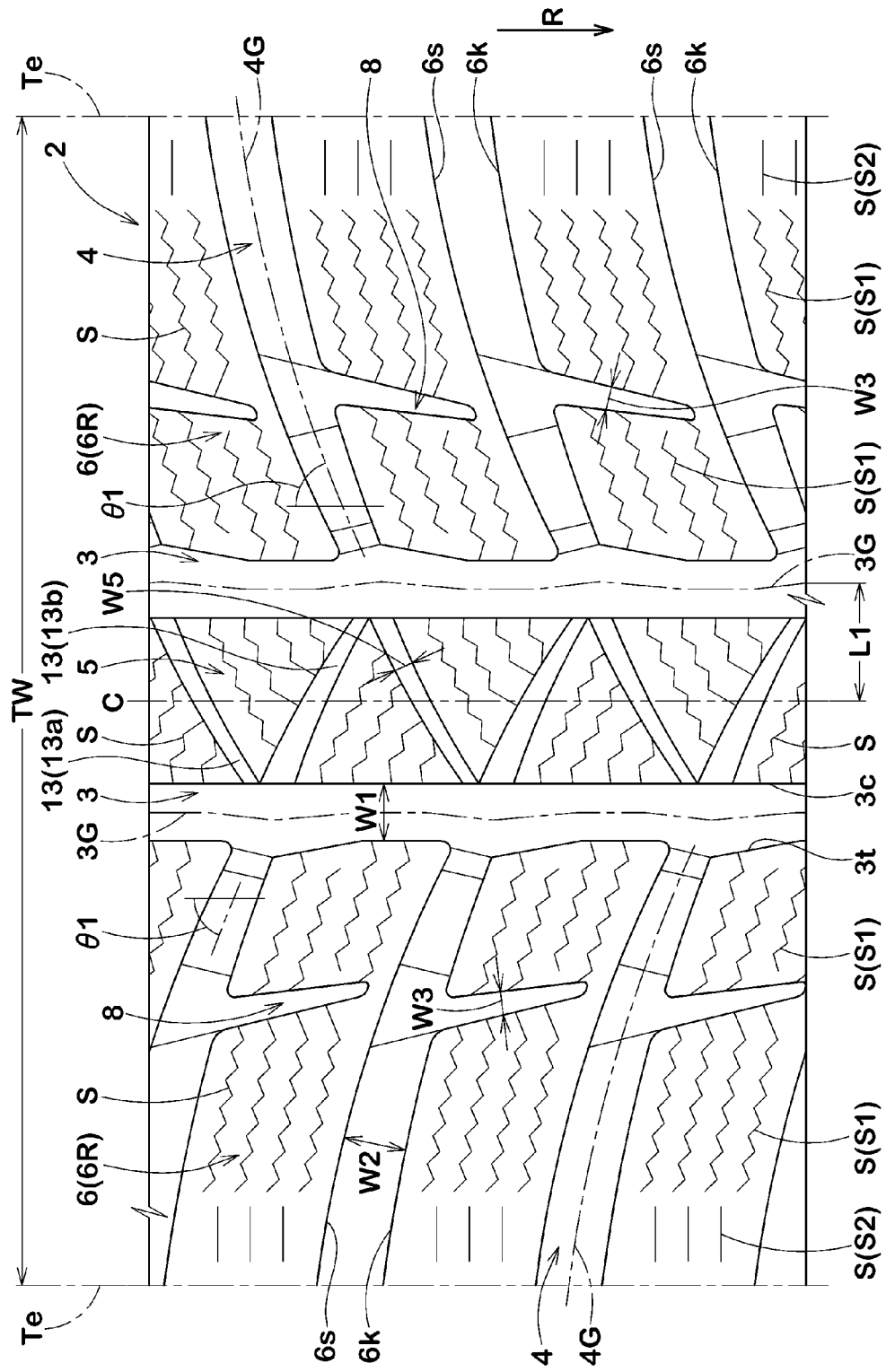
FIG. 1 is a development view of a tread portion of a pneumatic tire showing an embodiment of the present invention.

As shown in FIG. 1, a pneumatic tire (hereinafter it may be referred simply as "tire") in accordance with the present invention is suitably used for a studless tire for passenger cars with a non-symmetrical tread pattern with a specified rotational direction R. The specified rotational direction R is indicated by using characters on the sidewall portion (not shown) of the tire, for example.

In this embodiment, the tread portion 2 of the tire is provided with: a pair of crown main grooves 3 which is disposed on both sides of the tire equator C and extend continuously in the circumferential direction of the tire; and a plurality of inclined lateral grooves 4 which extend axially outside of the tire from each crown main groove 3 to at least each tread edge Te. By providing these grooves 3 and 4, the tread portion 2 is divided a crown land portion 5 between crown main grooves 3, and shoulder block row 6R with a plurality of shoulder blocks 6 defined by crown main grooves 4, inclined lateral grooves 5 and tread edges Te.

The crown land portion 5 and shoulder blocks 6 are provided with a plurality of sipes S, respectively. Since these sipes S have edges opened on the surface of the tread portion, high friction force against icy roads and capillary action may be obtained, and thereby the running performance of icy roads is improved.

Here, tread edges Te are the axially outermost edges in the ground contact patch, and the axial distance between tread edges Te and Te is defined as the tread width TW. The ground contact patch is defined as the ground contacting area of the tread portion 2 at a camber angle of zero when the tire is mounted on a standard rim and inflated to a standard inner pressure and loaded with a standard tire load. Also, dimensions and the like of portions of the tire have values under a standard unloaded condition that the tire is mounted on the standard wheel rim and inflated to the standard pressure but loaded with no tire load, unless otherwise stated.

The standard wheel rim is a wheel rim officially approved for the tire by standard organization, i.e. JATMA, T&RA, ETRTO and the like. The standard rim is the "standard rim" specified in JATMA, the "Measuring Rim" in ETRTO, and the "Design Rim" in TRA or the like.

The standard pressure is an air pressure for tire specified by the standard organization above. For example, the standard pressure is the "maximum air pressure" in JATMA, the "Inflation Pressure" in ETRTO, and the maximum pressure given in the "Tire Load Limits at various Cold Inflation Pressures" table in TRA or the like.

The standard tire load is a load for tire specified by the standard organization above. For example, the standard load is the "maximum load capacity" in JATMA, the "Load Capacity" in ETRTO, and the maximum value given in the above-mentioned table in TRA or the like.

In the case of passenger car tires, however, the standard pressure and standard tire load are defined by 180 kPa and 88% of the maximum tire load, respectively, without variation.

Each crown main groove 3 comprises an axially inner groove edge 3*c* which extends in straight manner in the circumferential direction of the tire, and an axially outer groove edge 3*t* which extends in zigzag manner in the circumferential direction of the tire. The outer groove edge 3*t* of the crown main groove 3 includes inclined parts inclined extending axially outside of the tire toward the anti-rotational direction. Such crown main grooves 3 can smoothly drain water backwardly along the inner groove edge 3c and make the rigidity of the crown land portion 5 higher, and thereby drainage performance and steering stability may be improved. Also, running performance on snowy and icy roads may improve due to axial factors of inclined parts in the outer groove edge 3t.

In order to obtain effects above, widths W1 of crown main grooves 3 are preferably not less than 1.2%, and more preferably not less than 1.5% of the tread width TW. Also, widths W1 of crown main grooves 3 are preferably not more than 6.7%, and more preferably not more than 6.5% of the tread width TW. In the same way, depths (not shown) of crown main grooves 3 are preferably not less than 7.0 mm, more preferably not less than 7.3 mm, more preferably not more than 8.5 mm, and further preferably not more than 8.2 mm.

Each crown main groove 3 has preferably a groove centerline 3G being located with an axial distance of from 2.5 to 20% of the tread width TW from the tire equator C to maintain rigidity of the tread portion 2 in well-balanced. In order to further improve the rigidity of the tread portion 2 in well-balanced, the groove centerline 3G is preferably located with an axial distance of from 5 to 15% of the tread width TW from the tire equator C.

Inclined lateral grooves 4 extend axially outside of the tire from each crown main groove 3 to each tread edge toward the anti-rotational direction. Such inclined lateral grooves 4 can drain water and snow therein or in the crown main grooves 3 toward tread edges Te with rotation of the tire, and thereby drainage performance and running performance on snowy roads may be improved in well-balanced.

In this embodiment, in a planer view, each inclined lateral groove 4 smoothly extends in a curved manner which protrudes toward the anti-rotational direction. Such inclined lateral grooves 4 can increase the lateral rigidity around tread edges Te, and thereby steering stability can be improved while maintaining drainage performance and running performance on snowy roads in well-balanced.

Inclined lateral grooves 4 have inclination angles $\theta 1$ of from 45 to 85 degrees with respect to the circumferential direction of the tire. If angles $\theta 1$ are less than 45 degrees, rigidity of shoulder blocks 6 may decrease, and thereby the traction force obtained by shoulder blocks may also decrease. On the other hand, if angles $\theta 1$ are more than 85 degrees, drainage resistance of inclined lateral grooves may increase, and thereby hydroplaning phenomenon may easily happen. From this point of view, angles $\theta 1$ are preferably in a range of from 50 to 80 degrees.

In this embodiment, widths W2 of inclined lateral grooves 4 are smoothly enlarged from each crown main groove 4 toward the axially outside of the tire. Accordingly, water or snow in inclined lateral grooves 4 are smoothly drained to the outside of the tire from tread edges Te.

In order to improve effects described above, widths W2 are preferably not less than 5 mm, more preferably not less than 8 mm, more preferably not more than 15 mm, and more preferably not more than 12 mm. In the same way, depths (not shown) of inclined lateral grooves 4 are preferably in a range of from 6 to 12 mm. Each shoulder block 6 comprises a heel-side edge 6s, and a toe-side edge 6k which comes into contact with roads later than the heel-side edge 6s when the tire rotates in the specified rotational direction R. In a planer view, the heel-side edge 6s smoothly extends in a curved manner, a single arc is demonstrated as the embodiment. Such heel-side edge 6s can maintain the rigidity of the shoulder block 6, and reduce drainage resistance of the inclined lateral groove 4, and thereby steering stability, drainage performance and running performance on icy and snowy roads can be improved in well-balanced.

Figure 2:
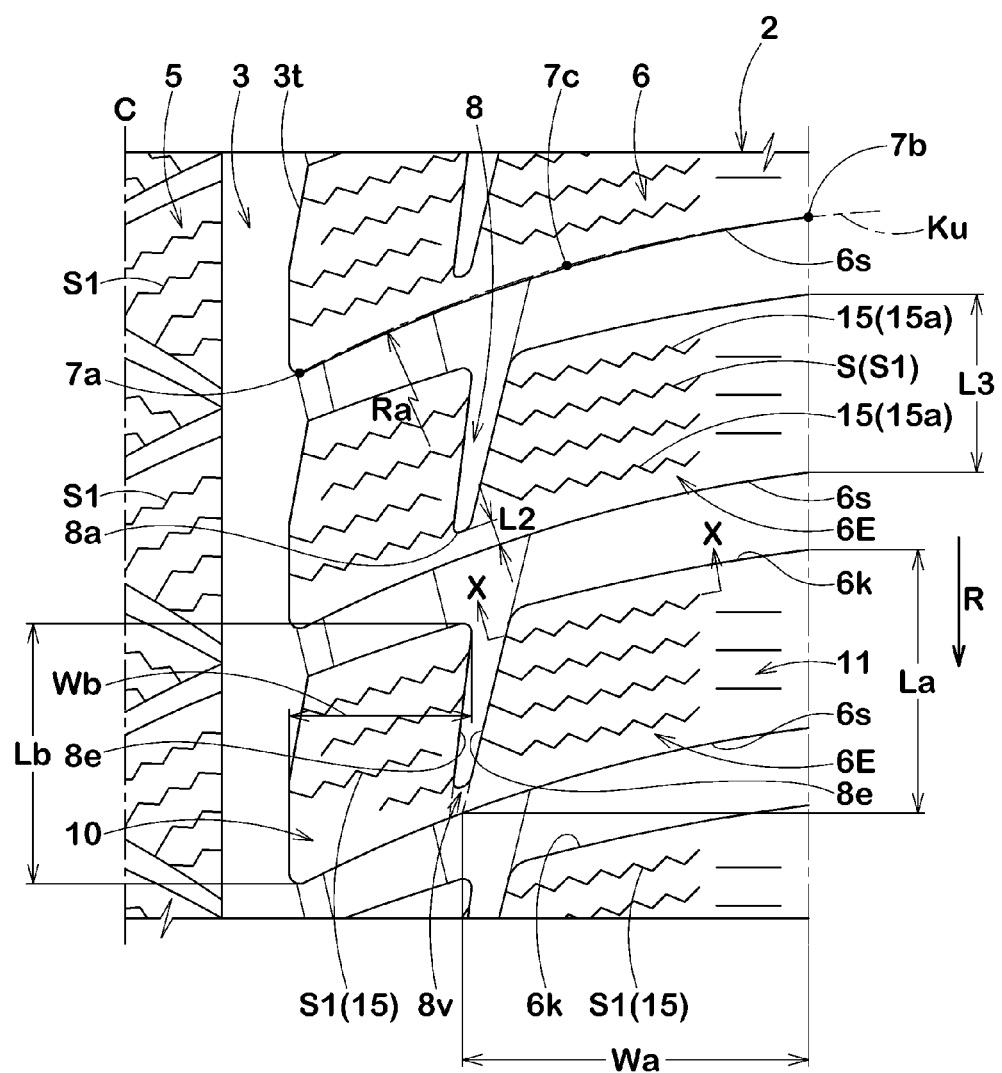
FIG. 2 is a partial enlarged view of FIG. 1.

As shown in FIG. 2, the heel-side edge 6s extends from the first end 7a intersecting the axially outer groove wall 3t of the crown main groove 3 to the second end 7b intersecting the tread edge Te through the middle point 7c which is the center between the first end 7a and the second end 7c in the axial direction of the tire. The single arc Ku which passes through the first end 7a, the second end 7b and the middle point 7c approximates to or coincides with the shape of heel-side edge 6s.

The radius of curvature Ra of the single ark Ku which passes through the first end 7a, the second end 7b and the middle point 7c is set in a range of from 150 to 250 mm. When the radius of curvature Ra is less than 150 mm, running performance on icy and snowy roads and the rigidity of shoulder blocks 6 tend to deteriorate. On the other hand, when the radius of curvature Ra is more than 250 mm, drainage performance tends to deteriorate. By setting the radius of curvature Ra in the range of from 150 to 250 mm, steering stability, drainage performance and running performance on icy and snowy roads can be further improved in well-balanced. In order to also improve effects described above, the radius of curvature Ra is preferably in a range of from 170 to 230 mm.

In each shoulder block 6, there is not provided any sipes which has ends connecting to the heel-side edge 6s. Moreover, in each shoulder block 6, there is not provided any grooves which have ends connecting to the heel-side edge 6s. Namely, all sipes S provided on shoulder blocks 6 terminate without connecting to heel-side edges 6s. Such shoulder blocks 6 obtain high traction force due to high rigidity around heel-side edges 6s, and thereby steering-stability and running performance on icy and snowy roads can be improved.

In order to further improve effects described above, each shoulder block 6 in accordance with the present embodiment has a heel-side portion 6E with a circumferential length within 4 mm, more preferably 6 mm from the heel-side edge 6s in which there is provided neither sipe nor groove.

Each shoulder block 6 in accordance with the present embodiment is provided with a sub groove 8 which extends from the toe-side edge 6k toward the heel-side edge 6s and has an end terminating in the shoulder block 6. Such sub groove 8 may drain water or snow therein away toward the anti-rotational direction with the rotation of the tire, and thereby increase drainage performance.

As shown in FIG. 2, if the shortest distance L2 between the end 8a of the sub groove 8 and the heel-side edge 6s is too large, drainage performance tends to deteriorate. On the other hand, the distance L2 is too small, the rigidity of shoulder block tends to decrease. From this point of view, the distance L2 is in a range of from 8 to 23% of the circumferential length L3 of the shoulder block 6 at the tread edge Te.

Each sub groove 8 is preferably inclined the axially outside of the tire toward the anti-rotational direction to improve drainage performance in which water under the tread is drained toward the axially outside of the tire with the rotation of the tire.

In this embodiment, the sub groove 8 has a width W3 (shown in FIG. 1) which gradually increases toward the anti-rotational direction. Accordingly, water in the sub groove 8 is smoothly drained toward the anti-rotational direction.

The width W3 of the sub groove 8 is preferably in a range of from 3.5 to 7.5 mm to improve drainage performance and steering stability in well-balanced. Here, the above-mentioned width W3 is a width measured at the center portion in the longitudinal direction of the sub groove 8. In the same way, the depth D3 (shown in FIG. 3(b)) of the sub groove 8 at the center portion is in a range of from 3.5 to 8.5 mm.

As shown in FIG. 2, each shoulder block 6 is virtually separated into an axially inner block-piece 10 and an axially outer block-piece 11 by a virtual sub groove 8v which is extended the end 8a of the sub groove 8 to the heel-side edge 6s such that each groove wall 8e thereof is smoothly extended. The outer block-piece 11 has an aspect ratio La/Wa of a maximum circumferential length La thereof to its maximum axial width Wa, and the inner block-piece 10 has an aspect ratio Lb/Wb of a maximum circumferential length Lb thereof to its maximum axial width Wb. Moreover, the aspect ratio La/Wa of the outer block-piece 11 is preferably 0.45 to 0.75 times as much as the aspect ratio Lb/Wb of the inner block-piece 10. If the aspect ratio La/Wa of the outer block-piece 11 is too large as compared to that of the inner block-piece 10, the rigidity of the outer block-piece 11 tends to decrease, and thereby steering stability of the tire may deteriorate. On the other hand, if the aspect ratio La/Wa of the outer block-piece 11 is too small as compared to that of the inner block-piece 10, the rigidity of the inner block-piece 10 and drainage performance tends to decrease. From this point of view, the aspect ratio La/Wa of the outer block-piece 11 is preferably 0.50 to 0.70 times as much as the aspect ratio Lb/Wb of the inner block-piece 10.

As shown in FIG. 1, sipes S comprise zigzag sipes S1 which extend in a zigzag manner, and straight sipes S2 which extend in a straight manner. Each straight sipe S2 is disposed the nearest position of tread edges Te. Namely, the straight sipes S2 are arranged on the axially outside of zigzag sipes S1.

Each zigzag sipe S1 in accordance with the present embodiment is formed as a semi-opened sipes or a full-opened sipes each which has at least one end connected with the crown main groove 3 or the sub groove 8. Since zigzag sipes S1 have long edges as compared to the straight sipe, running performance on icy roads can be improved.

Figure 3A:
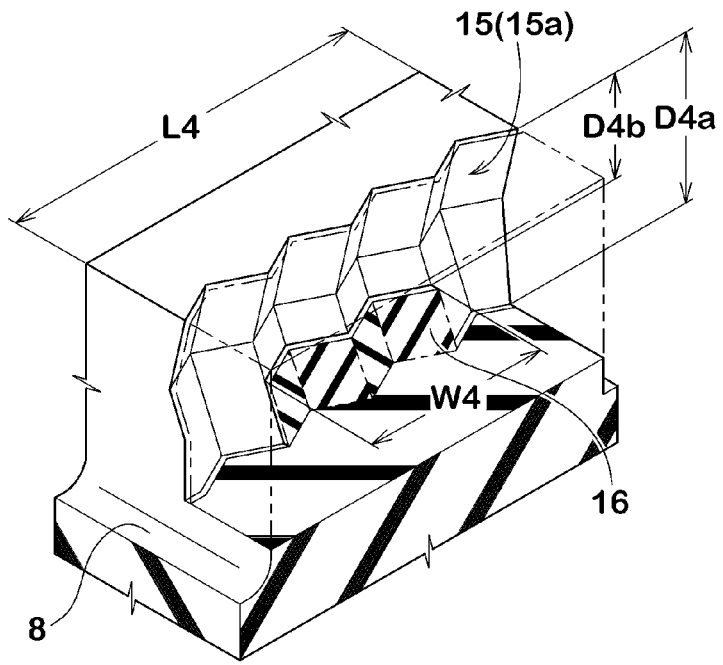
FIG. 3 (*a*) is a perspective view of a line x-x of FIG. 2.

As shown in FIG. 3(a), the zigzag sipe S1 in accordance with the present embodiment has three dimensional configuration in a so-called Miura-ORI which has an open top end that opens to the surface of the tread portion 2 with a zigzag part, and the zigzag part of the open top extends to a bottom thereof while oscillating the zigzag part along with the length direction of the sipe. Since block pieces facing each other through the sipe can rigidly engage each other, MIURA-ORI sipe improves the rigidity of shoulder blocks 6, and thereby steering stability of the tire also can be improved.

As shown in FIG. 2, zigzag sipes S1 on each shoulder block 6 (hereinafter these sipes may be referred as "shoulder zigzag sipes 15") are disposed in the circumferential direction of the tire 1 with an interval therebetween and extend along inclined lateral grooves 4. Since each shoulder block 6 has high scratching action against icy roads due to edges of shoulder zigzag sipes 15, running performance on icy roads can be improved.

Figure 3B:
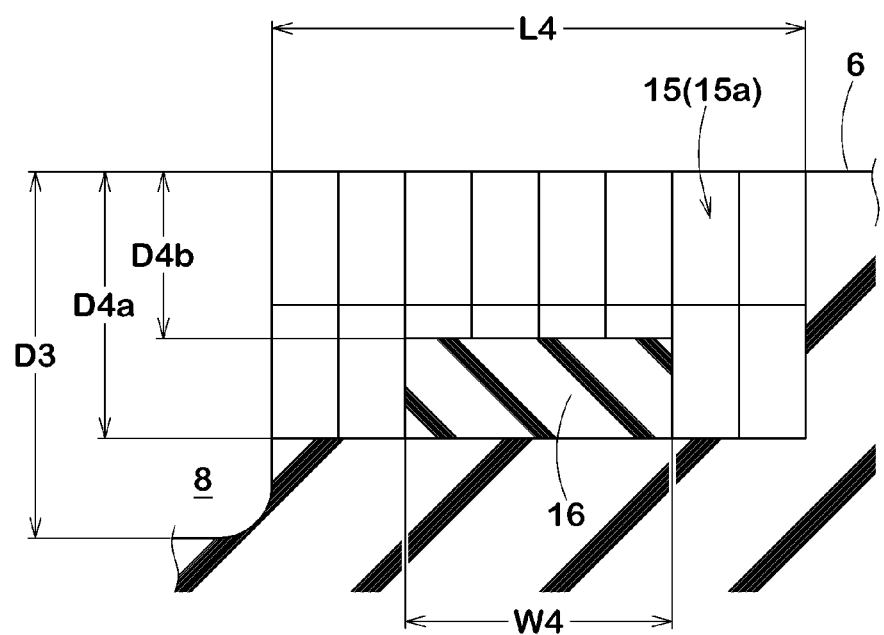

As shown in FIGS. 3(a) and 3(b), at least one shoulder zigzag sipe 15 is preferably provided with a tie-bar 16 in the center region of length direction of the so as to decrease its depth. The tie-bar 16 can prevent clogging up the sipe 15, and thereby running performance on icy and snowy roads can be further improved. Especially, the tie-bar 16 is preferably provided on shoulder zigzag sipes 15a (shown in FIG. 2) arranged in the circumferentially outermost of the block 6.

In order to improve the effect described above, the depth D4b of the zigzag sipe 15a at the tie-bar 16 is preferably in a range of from 0.25 to 0.55 times the maximum depth D4a of the shoulder zigzag sipe 15a, and the length W4 of the tie-bar 16 is preferably in a range of from 0.1 to 0.3 times the whole length L4 of the zigzag shoulder sipe 15a.

Each straight sipe S2 in accordance with the present embodiment are formed as a closed sipe with both ends terminating in the shoulder block 6. By employing such straight sipes S2 with closed ends near the tread edge Te in which large side force is applied during cornering, the rigidity of axially outside portion of the shoulder block 6 increases, and thereby steering stability of the tire can be improved. However, straight sipes S2 may be change into zigzag sipes of MIURA-ORI type.

As shown in FIG. 1, the crown land portion 5 is provided with crown lateral grooves 13.

Crown lateral grooves 13 comprise the first crown lateral grooves 13a which are inclined at one side (upward to the right in this embodiment) with respect to the circumferential direction of the tire, and a second crown lateral grooves 13b which are inclined at the other side (upward to the left in this embodiment) with respect to the circumferential direction of the tire. Also, the first and second crown lateral grooves 13a, 13b are alternately arranged in the circumferential direction of the tire. From this, in a plan view, a plurality of triangle shaped blocks are defined in the crown land portion 5.

Widths of both the first crown lateral groove 13a and the second lateral groove 13b gradually increase toward the anti-rotational direction. Each first crown lateral groove 13a is smoothly connected to each inclined lateral groove 4 indicated at the right side of FIG. 1 through the crown main groove 3. Also, each second crown lateral groove 13b is smoothly connected to each inclined lateral groove 4 indicated at the left side of FIG. 1 through the crown main groove 3. Namely, each extended groove centerline 4G of each inclined lateral groove 4 passes through in each crown lateral groove 13, respectively. Since water under the crown land portion is continuously and smoothly drained from crown lateral grooves 13 to inclined lateral grooves 4, drainage performance can be improved.

In order to improve the effect described above while maintaining both steering stability and running performance on icy roads, widths W5 of crown lateral grooves 13 are preferably in a range of from 55 to 95% of widths W2 of inclined lateral grooves 4. Also, depths D5 (not shown) of crown lateral grooves 13 are preferably in a range of from 2 to 8 mm.

The present invention is more specifically described and explained by means of the following Examples and References. It is to be understood that the present invention is not limited to these Examples.

Comparison Test

Pneumatic tires of size 195/65R15 with identical internal structures and same tread patterns as shown in FIG. 1 except for details shown in Table 1 were made. Major common specifics and test method are as follows.

Tread width TW: 150 mm
Crown Main Groove
    W1/TW: 5.0% to 6.5%
    Depth: 8.5 mm
Inclined Lateral Groove
    Width W2: 5 mm to 15 mm
    Depth: 4.5 mm to 8.5 mm
Sub Groove
    Width W3: 3.5 mm to 7.5 mm
    Depth D3: 7.5 mm
Crown Lateral Groove
    Depth: 3.5 mm
Sipe
    Maximum depth D4a: 4.0 mm to 8.0 mm Running Performance on Snowy, Icy and Dry Roads:

The test tires were mounted on wheel rims of 15×6JJ with an inner pressure of 210 kPa and installed in a vehicle (FF car with a displacement of 2,000 cc), the test driver drove the vehicle on each snowy, icy and dry (asphalt road) roads respectively, and evaluated its steering stability based on cornering response, rigidity of tires, and grip performance. The results are indicated in Table 1 by scores based on Ref.1 being 100, wherein the larger the score, the better the performance is.

Traction Test on Snowy Roads

The test vehicle described above was entered into a straight course with a snow and 50 m long, and the running time of each tested tire was measured. The reciprocal of the running time is shown in Table 1 by an index based on Ref.1 being 100, wherein the larger the index number, the better the traction performance is.

Wet Performance Test (Lateral Hydroplaning Test):

The test vehicle described above was entered into a course with a water puddle 10 mm deep and 20 m long, on an asphalt road surface with a radius of 100 m, with stepwise speed increase. Then, lateral acceleration (lateral G) of the vehicle was measured, and average lateral G of the front wheels at speeds of 55 to 80 km/h was calculated. Calculation results are shown with an index of 100 representing a value in Ref.1. Larger the values, the better the performance is.

TABLE 1-1

|  | Ref. 1 | Ex. 1 | Ex. 2 | Ex. 3 | Ex. 4 | Ref. 2 | Ex. 5 | Ex. 6 | Ex. 7 |
| --- | --- | --- | --- | --- | --- | --- | --- | --- | --- |
| Radius of curvature Ra(mm) | 140 | 150 | 170 | 230 | 250 | 260 | 200 | 200 | 200 |
| L1/TW (%) | 10 | 10 | 10 | 10 | 10 | 10 | 10 | 20 | 2.5 |
| D4b/D4a (%) | 40 | 40 | 40 | 40 | 40 | 40 | 40 | 40 | 40 |
| (La Wb)/(Wa Lb) | 0.6 | 0.6 | 0.6 | 0.6 | 0.6 | 0.6 | 0.6 | 0.6 | 0.6 |
| Traction on snowy roads (Index) | 100 | 105 | 106 | 108 | 108 | 109 | 108 | 105 | 106 |
| Running performance on snowy roads (Score) | 100 | 100 | 101 | 102 | 102 | 101 | 102 | 103 | 101 |
| Running performance on icy roads (Score) | 100 | 100 | 101 | 101 | 101 | 100 | 101 | 102 | 101 |
| Steering stability (Score) | 100 | 101 | 101 | 102 | 102 | 102 | 101 | 99 | 100 |
| Drainage performance (Score) | 100 | 99 | 98 | 96 | 94 | 90 | 98 | 98 | 99 |

TABLE 1-2

|  | Ex. 8 | Ex. 9 | Ex. 10 | Ex. 11 | Ex. 12 | Ex. 13 | Ex. 14 | Ex. 15 | Ex. 16 |
| --- | --- | --- | --- | --- | --- | --- | --- | --- | --- |
| Radius of curvature Ra(mm) | 200 | 200 | 200 | 200 | 200 | 200 | 200 | 200 | 200 |
| L1/TW (%) | 1.5 | 10 | 10 | 10 | 10 | 10 | 10 | 10 | 10 |
| D4b/D4a (%) | 40 | 22 | 25 | 55 | 57 | 40 | 40 | 40 | 40 |
| (La Wb)/(Wa Lb) | 0.6 | 0.6 | 0.6 | 0.6 | 0.6 | 0.4 | 0.45 | 0.75 | 0.8 |
| Traction on snowy roads (Index) | 106 | 107 | 107 | 106 | 105 | 104 | 106 | 105 | 105 |
| Running performance on snowy roads (Score) | 100 | 101 | 102 | 102 | 102 | 102 | 102 | 102 | 101 |
| Running performance on icy roads (Score) | 100 | 100 | 101 | 101 | 101 | 101 | 101 | 101 | 101 |
| Steering stability (Score) | 99 | 102 | 100 | 100 | 99 | 100 | 100 | 100 | 100 |
| Drainage performance (Score) | 100 | 96 | 97 | 99 | 99 | 99 | 99 | 99 | 99 |

From the test results, it was confirmed that performance of example tires according to the present invention can be effectively improved as compared to references.

The invention claimed is:

1. A pneumatic tire having a specified rotational direction, said tire comprising a tread portion provided with: a pair of circumferentially extending crown main grooves disposed on both sides of the tire equator; a plurality of inclined lateral grooves each extending axially outside of the tire from each crown main groove to each tread edge toward the anti-rotational direction to separate a plurality of shoulder blocks between crown main grooves and tread edges; and a sipe, said inclined lateral grooves having inclination angles of from 45 to 85 degrees with respect to the circumferential direction of the tire,
said each shoulder block having a heel-side edge and a toe-side edge which comes into contact with a road later than the heel-side edge in the specified rotational direction,
in a planer view, said heel-side edge smoothly extending in a curved manner from a first end intersecting a groove wall of said crown main groove to a second end intersecting said tread edge through a middle point which is a center between the first end and the second end in the axial direction of the tire, said heel-side edge having a radius of curvature of from 150 to 250 mm which is measured as a radius of curvature of an arc passing through the first end, the second end and the middle point,
all sipes provided on shoulder blocks terminating without connecting to heel-side edges,
a crown land portion being disposed between said crown main grooves and being provided with crown lateral grooves, wherein said crown lateral grooves comprise first crown lateral grooves which are inclined at one side with respect to the circumferential direction of the tire, and second crown lateral grooves which are inclined at the other side with respect to the circumferential direction of the tire, and said first and second crown lateral grooves are alternately arranged in the circumferential direction of the tire to separate a plurality of triangle shaped blocks in the crown land portion.

2. The tire according to claim 1, wherein
said each crown main groove has a groove centerline located with an axial distance of from 2.5 to 20% of a tread width from the tire equator.

3. The tire according to claim 1 or 2, wherein
said each shoulder block has a heel-side portion within 4 mm from the heel-side edge in the circumferential direction, and
said heel-side portion is formed as a plane portion in which there is provided neither sipe nor groove.

4. The tire according to claim 1 or 2, wherein
said inclined lateral grooves have groove widths of from 5 to 15 mm.

5. The tire according to claim 1 or 2, wherein
said each shoulder block is provided with a sub groove which extends from the toe-side edge toward the heel-side edge and has an end terminating in said shoulder block.

6. The tire according to claim 5, wherein
when said each shoulder block is virtually separated into an axially inner block-piece and an axially outer block-piece by a virtual sub groove which is extended the end of the sub groove to the heel-side edge, each block-piece has an aspect ratio L/W of a maximum circumferential length L thereof to its maximum axial width W, and the aspect ratio of the outer block-piece is 0.45 to 0.75 times as much as the aspect ratio of the inner block-piece.

7. The tire according to claim 5, wherein
each said sub groove is inclined the axially outside of the tire toward the anti-rotational direction.

8. The tire according to claim 5, wherein
each said sub groove has a width W3 which gradually increases toward the anti-rotational direction.

9. The tire according to claim 1, wherein widths of said first crown lateral grooves and second crown main grooves gradually increase toward the anti-rotational direction of the tire.

10. A pneumatic tire having a specified rotational direction comprising a tread portion provided with a pair of circumferentially extending crown main grooves disposed on both sides of the tire equator and a plurality of inclined lateral grooves each extending axially outside of the tire from each crown main groove to each tread edge toward the anti-rotational direction to separate a plurality of shoulder blocks between crown main grooves and tread edges,
    said inclined lateral grooves having inclination angles of from 45 to 85 degrees with respect to the circumferential direction of the tire,
    said each shoulder block having a heel-side edge and a toe-side edge which comes into contact with a road later than the heel-side edge in the specified rotational direction,
    in a planer view, said heel-side edge smoothly extending in a curved manner from a first end intersecting a groove wall of said crown main groove to a second end intersecting said tread edge through a middle point which is a center between the first end and the second end in the axial direction of the tire, said heel-side edge having a radius of curvature of from 150 to 250 mm which is measured as a radius of curvature of an arc passing through the first end, the second end and the middle point, and wherein
    said each shoulder block is provided with a sub groove which extends from the toe-side edge toward the heel-side edge and has an end terminating in said shoulder block,
    said each shoulder block is virtually separated into an axially inner block-piece and an axially outer block-piece by a virtual sub groove which is extended the end of the sub groove to the heel-side edge, and
    each block-piece has an aspect ratio L/W of a maximum circumferential length L thereof to its maximum axial width W wherein the aspect ratio of the outer block-piece is 0.45 to 0.75 times as much as the aspect ratio of the inner block-piece.

\* \* \* \* \*